United States Patent [19]

Nelson et al.

[11] Patent Number: 4,788,871
[45] Date of Patent: Dec. 6, 1988

[54] PROBE FOR SENSING TEMPERATURE AND/OR PRESSURE

[75] Inventors: Edmund A. Nelson, Timonium; Arthur E. Colvin, Mt. Airy, both of Md.; Matthew W. Hanley, Washington, D.C.; Stephen C. Scott, Frederick, Md.

[73] Assignee: Steeltin Can Corporation, Baltimore, Md.

[21] Appl. No.: 128,420

[22] Filed: Dec. 3, 1987

Related U.S. Application Data

[62] Division of Ser. No. 896,407, Aug. 14, 1986, Pat. No. 4,739,699.

[51] Int. Cl.$^4$ .......................... G01K 1/14; G01K 7/02; G01L 19/00; G01D 21/02
[52] U.S. Cl. ..................... 73/866.5; 73/756; 374/143; 374/155
[58] Field of Search ................. 73/866.5, 756, 708; 374/155, 143, 208, 209

[56] References Cited

U.S. PATENT DOCUMENTS

| | | | |
|---|---|---|---|
| 1,683,743 | 9/1928 | Thompson | 374/143 |
| 1,867,739 | 7/1932 | Thompson | 374/143 |
| 1,881,855 | 10/1932 | Mullen | 99/370 |
| 1,918,258 | 7/1933 | Fredricksen | 374/143 |
| 1,927,043 | 9/1933 | Mullen | 99/370 |
| 2,017,365 | 10/1935 | Klein | 225/16 |
| 2,239,121 | 4/1941 | Dimmock | 374/143 |
| 2,536,116 | 1/1951 | Wilbur | 99/212 |
| 2,609,406 | 9/1952 | Borsy | 374/155 X |
| 3,215,538 | 11/1965 | Sada | 99/214 |
| 3,343,417 | 9/1967 | Peek, Jr. | |
| 3,435,400 | 3/1969 | Beckman | 377/155 X |
| 3,531,300 | 9/1970 | Greenberg et al. | 99/214 |
| 3,816,633 | 6/1974 | Schack | 426/407 |
| 3,901,062 | 8/1975 | Lynch et al. | 73/64.2 |
| 3,964,313 | 6/1976 | Connick | 73/52 X |
| 3,983,756 | 10/1976 | Dangviller et al. | 73/866.5 |
| 3,986,832 | 10/1976 | Smorenburg | 21/80 |
| 4,088,444 | 5/1978 | Byrne | 21/56 |
| 4,164,590 | 8/1979 | Mencacci | 426/407 |
| 4,179,986 | 12/1979 | Mencacci | 99/359 |
| 4,275,592 | 6/1981 | Atwood et al. | 73/866.5 |
| 4,340,610 | 7/1982 | Nibros | 426/88 |
| 4,346,650 | 8/1982 | Zaitsu | 99/361 |
| 4,468,135 | 8/1984 | McCain et al. | 374/44 |
| 4,468,968 | 9/1984 | Kee | 73/708 |
| 4,522,056 | 6/1985 | Chin et al. | 73/64.2 |
| 4,569,228 | 2/1986 | Bellgerdt et al. | 73/886.5 |
| 4,739,669 | 4/1988 | Nelson et al. | 49/370 X |

FOREIGN PATENT DOCUMENTS 985440 3/1965 United Kingdom ................ 374/155

Primary Examiner—Tom Noland
Attorney, Agent, or Firm—Leonard Bloom

[57] ABSTRACT

A probe suitable for monitoring temperature and pressure in a relatively thin-walled container fabricated from plastic. The internal probe monitors the pressure and temperature at substantially the geometric center of a container in a pasteurizing or sterilizing apparatus. The probe is provided with a sharp container-wall piercing end and a tapered threaded self tapping portion which provides an effective seal. The probe is hollow so that fluid can be conducted from the interior of the container and its pressure determined. A temperature sensing member is carried within the hollow probe so that temperature within the container may be sensed.

6 Claims, 9 Drawing Sheets

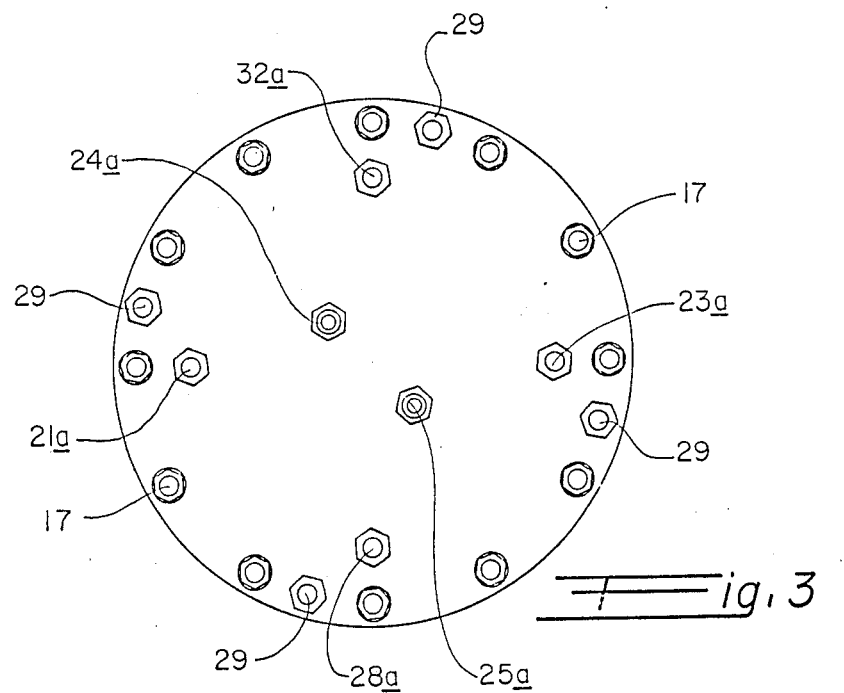
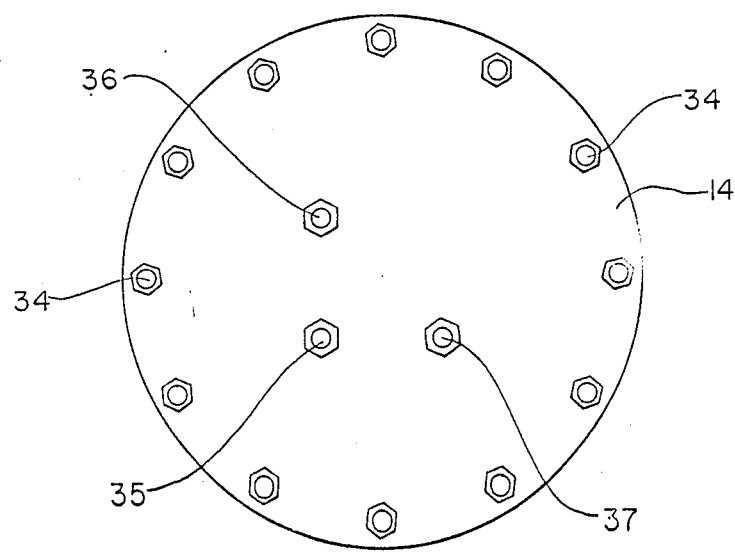

PROBE FOR SENSING TEMPERATURE AND/OR PRESSURE

This application is a division of application Ser. No. 896,407, filed Aug. 14, 1986 and now U.S. Pat. No. 4,739,699.

BACKGROUND OF THE INVENTION

1. Field of the Invention

The present invention relates to a probe for sensing temperature and/or pressure which is particularly useful in an apparatus for and the process therefor. More particularly, the present invention relates to such a probe for sensing pressure which is useful in an apparatus for and process of pasteurizing or sterilizing and subsequent cooling of foodstuffs within sealed thin-walled containers, wherein the pressure within the apparatus is controlled and maintained so as to be substantially equal to or substantially at a predetermined differential from the pressure within the thin-walled containers during pasteurization or sterilization and the subsequent cooling thereof.

2. Prior Art

There have been numerous devices and processes proposed in the prior art which have attempted to preserve material which has been packed in hermetically sealed containers. One of the most perplexing problems faced in developing such devices and processes has been maintenance of the pressure inside the pasteurizer or sterilizer so as to counteract pressure developed inside of the containers during the pasteurizing or sterilizing process itself without the influence of changing the thermal conditions thereof.

A method for cooking or preserving material packed in hermetically sealed containers in which the material is subjected to sterilizing temperatures is known from U.S. Pat. No. 1,881,855 to George W. Mullen entitled "Method for Preserving" and granted Oct. 11, 1932. It was recognized that internal pressure within the containers in excess of external steam pressure, if not counterbalanced, may distort metallic containers or burst glass containers. In order to overcome the difficulty, it was proposed to entrap a quantity of air, preferably at atmospheric pressure, in the retort within which the containers were to be placed, and to subject the air to the same heating medium as the containers. No provisions were made to add air under pressure to the entrapped air or to vent air or steam from the retort to provide real time control of pressure differential.

A process of heating and sterilizing food products packaged in hermetically sealed containers is known from U.S. Pat. No. 3,215,538 to Pietro Sader et al. entitled "Process for Heating and Sterilizing Food Products Packaged in Hermetically Sealed Thin Walled Containers" and granted Nov. 2, 1965 similar to the method disclosed in the patent to Mullen, supra. Rather than simply entrapping air, it was proposed to increase the pressure within the autoclave (retort) by a pressurized fluid to balance increased pressure within the containers as the containers are heated and, as the containers are cooled, discharging the pressurized fluid t balance the decrease in pressure within the containers. No provisions were made to measure the actual pressure within the thin-walled containers nor to use such a measurement, in conjunction with a measurement of pressure within the autoclave (retort),.to provide real time control of pressure differential.

A process for cooking, baking or sterilizing foodstuff within a retort and contained in sealed, imperforate, flexible packages formed of film or sheet material is known from U.S. Pat. No. 3,531,300 to Greenberg et al. entitled "Process for Heat Treating Food Sealed Within Flexible Containers" and granted Nov. 17, 1964 in which an effort is made to counteract expansion of the packages beyond a volume limit by providing sufficient external pressure on the packages. No provision is made to determine the actual pressure within the packages and the actual pressure within the retort, nor to control the pressure differential in real time.

Of interest as general background prior art are a number of U.S. Letters Patents identified as follows:

| U.S. Pat. No. | Inventor(s) | Granting Date |
| --- | --- | --- |
| 3,816,633 | Schack | June 11, 1974 |
| 3,986,832 | Smorenburg | October 19, 1976 |
| 4,088,444 | Byrne | May 9, 1978 |
| 4,164,590 | Mencacci | August 14, 1979 |
| 4,340,610 | Nioras | July 20, 1982 |
| 4,346,650 | Zaitsu | August 31, 1982 |
| 4,468,135 | McCain et al. | August 28, 1984 |
| 4,468,968 | Kee | September 4, 1984. |

Processes and apparatuses have been proposed to avoid the problem of distorting containers during pasteurizing or sterilization of the contents by resorting to heavy thick-walled containers fabricated from material, such as metal, which is costly and not conducive to marketing. Additionally, use of such containers requires special equipment for punching holes therethrough so that the appropriate sensing equipment may be inserted thereinto. Such equipment is costly, requires additional floor space and labor and slows production.

In recent years, however, there have been great developments in the field of plastics. Despite these recent developments, no one has yet devised an apparatus or process for pasteurizing or sterilizing foodstuffs within thin-walled containers in a chamber (retort) and subsequent cooling thereof which utilizes techniques for controlling the pressure within the chamber on the basis of real time actual pressure measurements of pressure within a container or containers and the chamber.

SUMMARY OF THE INVENTION

An object of the present invention is to provide a probe for sensing temperature and/or pressure which may be used in an apparatus having a chamber for pasteurizing or sterilizing edible foodstuffs in sealed, flexible containers, while monitoring temperature and/or pressure within at least one of the containers. The foregoing objects are achieved, in accordance with the present invention, by providing a probe as defined in the appended claims.

BRIEF DESCRIPTION OF THE DRAWINGS

FIG. 3 is a plan view of the bottom of the retort illustrated in FIGS. 1 and 2.

FIG. 4 is a plan view of the top of the retort illustrated in FIGS. 1 and 2.

DETAILED DESCRIPTION OF THE PREFERRED EMBODIMENT

Figure 1:
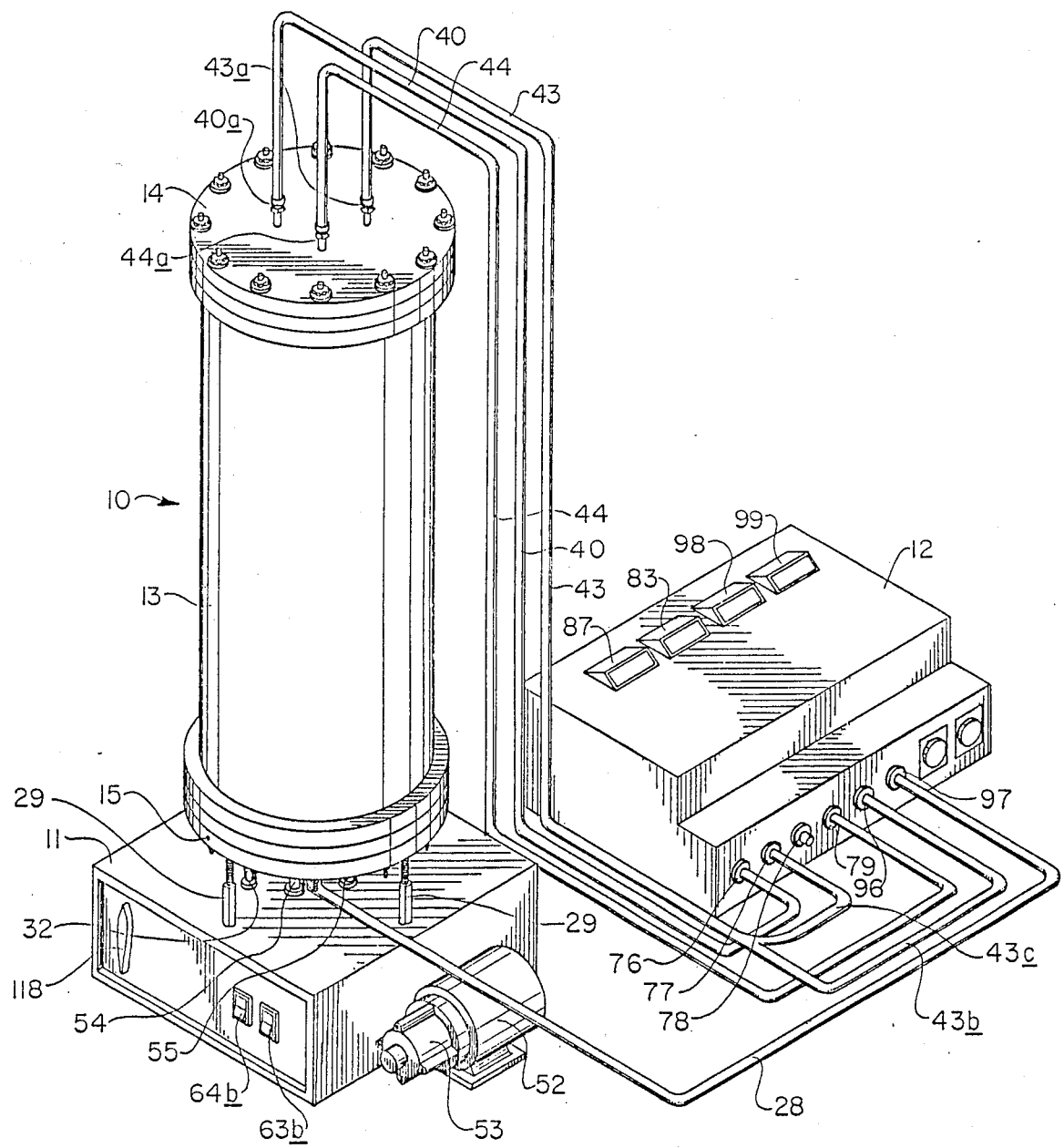
FIG. 1 is a pictorial view of an exemplary embodiment of an apparatus for pasteurizing or sterilizing and subsequent cooling of edible foodstuffs which may be used in practicing the present invention.

Referring now to the drawings, wherein like numerals refer to like parts, there is illustrated in FIG. 1 the preferred embodiment of an apparatus for pasteurizing or sterilizing foodstuffs which includes a pressurized vessel 10 (commonly referred to by those skilled in the art as a "retort") connected to its associated water circulation means and temperature control means which are conveniently housed within a housing 11. A pressure controller 12 is provided. The retort 10 provides a heat treatment chamber 13 for the pasteurizing or sterilizing of edible foodstuffs which may (or may not) contain a material which releases a gas or vapor upon being heated. The chamber 13 within the retort 10 further provides a place for cooling the containers and the foodstuffs therein subsequent to the pasteurizing or the sterilizing thereof. The process involves placing the foodstuffs in a plurality of containers, hermetically sealing the containers and heating the containers to a temperature and for a period of time sufficient to effect the desired sterilization or pasteurization and then to subsequently cool the same. If desired, the containers may be evacuated before sealing, but this is not necessary. The heating and/or cooling may or may not be sufficient to generate a gas or vapor within the containers. However, in the event that such gasses or vapors are generated, as contemplated by this invention, the pressure within the containers increase expanding the walls of the containers to a prescribed volume limit. In response to this increase in pressure within the containers, air under pressure is fed into the retort 10 to raise the pressure therein to a level substantially equal to the pressure level within the containers, thereby constantly maintaining the volume within the container by counteracting further expansion thereof. This prevents the walls of the containers from deflecting beyond a point at which they will rupture or become permanently deformed. Throughout this heating and cooling process the water involved is circulated through the retort 10 by a conventional water circulating means housed within the housing 11. Temperature control is maintained by a conventional temperature control means also positioned within the housing 11 and a water temperature sensor, such a thermocouple within the retort 10, the output of which is coupled to the temperature control means within the housing. Pressure control of the process is maintained by a pressure controller 12 in accordance with the present invention.

Referring now to FIGS. 1–4 the retort 10 is comprised of the hollow, substantially cylindrical chamber 13 having an upper cover 14 and a bottom cover 15. The hollow cylindrical chamber 13 can be fabricated from any suitable material able to withstand temperatures of from 0° F. to 200° F. Such materials include, without limitation, acrylics, metal, metal alloys and certain types of plastics, to name but a few.

The bottom cover 15 is a substantially circular shaped element which is positioned over the bottom of the chamber 13. The bottom cover 15 is, like the retort 10, fabricated from any suitable material able to withstand temperatures of from 0° F. to 200° F. In the preferred embodiment, the bottom cover 15 is fabricated from polypropylene although any suitable material such as metal, metal alloys and certain plastics, to name but a few, would suffice. The bottom cover 15 is secured in place by a threading arrangement between plurality of stud bolts 16 and nuts 17 or by any other suitable means. Attached thusly, an airtight and watertight seal between the chamber 13 and the bottom cover 15 is formed.

Figure 2:
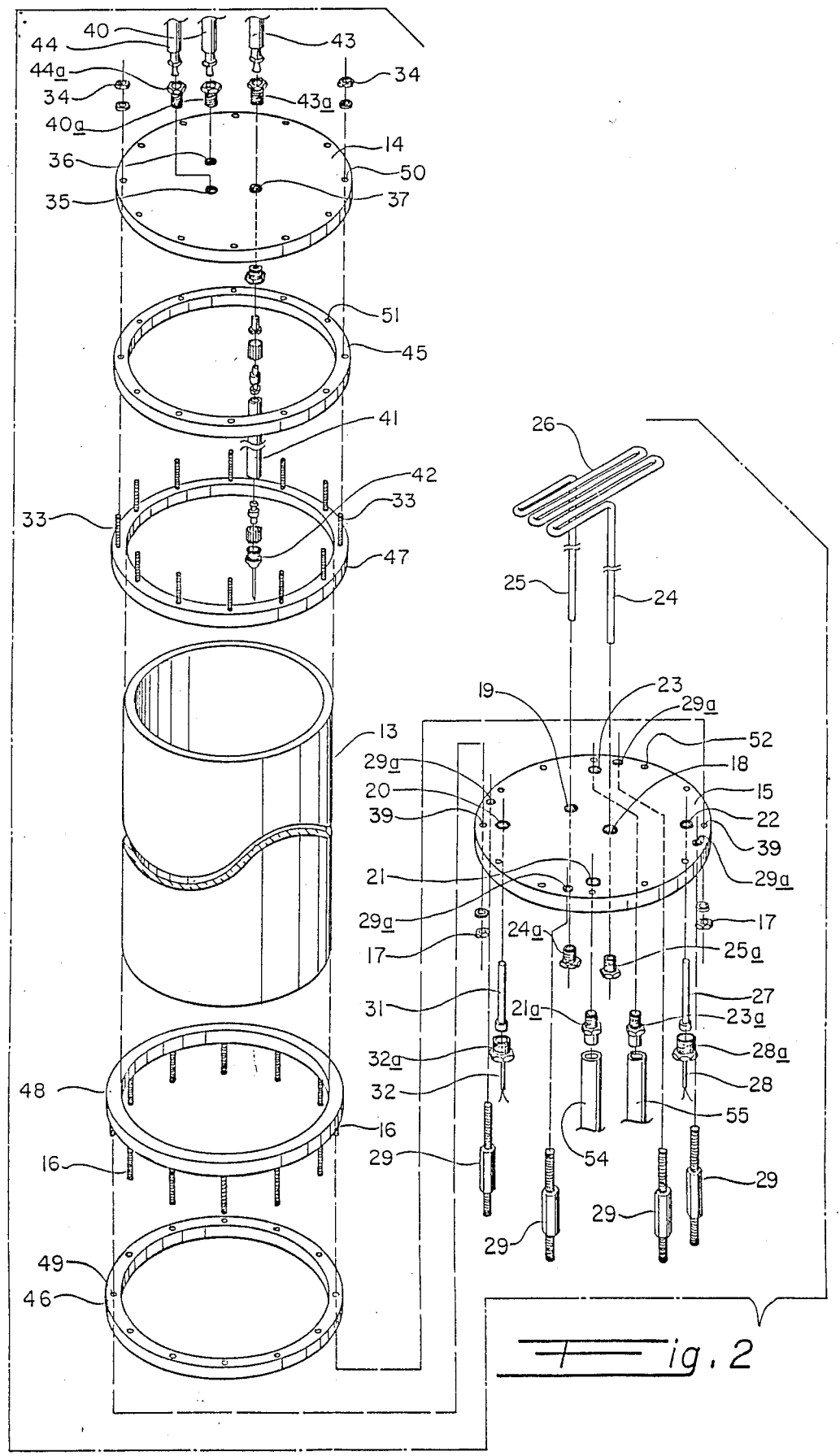
FIG. 2 is an exploded view of the retort illustrated in FIG. 1 and its associated heating element.
Figure 5:
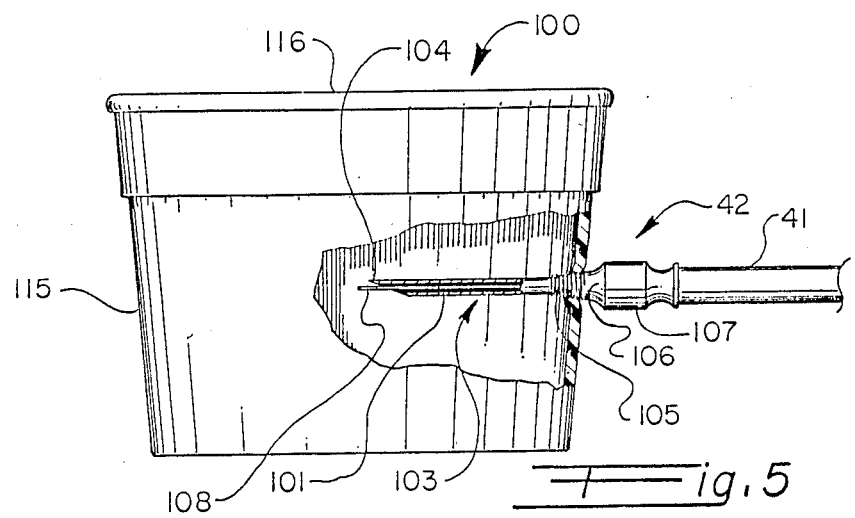
FIG. 5 is a side view of a container for foodstuffs, the container being partially broken away to show the positioning of a pressure and temperature sensing probe with respect thereto, an end portion of the probe being broken away to expose a temperature sensor.
Figure 6:
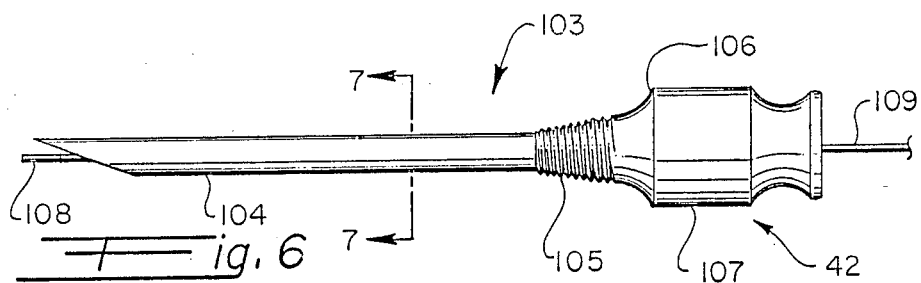
FIG. 6 is a side view of the probe of FIG. 5.
Figure 7:
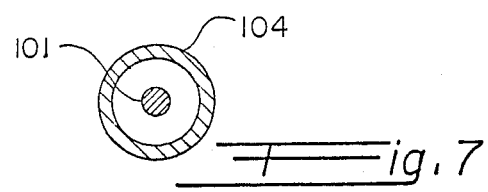
FIG. 7 is a cross-sectional view of the probe of FIG. 6, the section being taken along section line 7—7.
Figure 8:
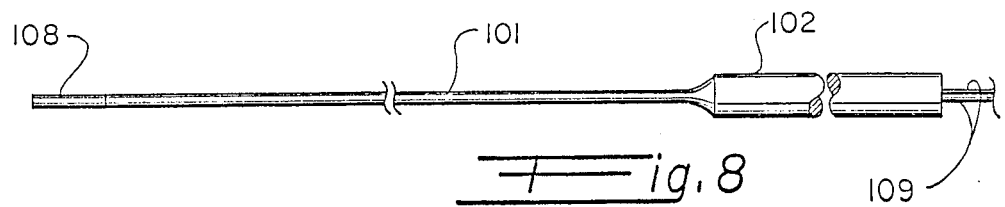
FIG. 8 is a side view of a temperature sensor suitable for use in the probe of FIG. 5.

With additional and particular reference now to FIGS. 2 and 3, the bottom cover 15 is provided with six threaded apertures 18, 19, 20, 21, 22 and 23 formed therein. The apertures 18 and 19 are formed in the bottom cover 15, substantially equidistantly from the edge thereof, so as to permit passage through the cover 15 of insulated electrical cables 24 and 25, which are fixed within threaded fittings 24a and 25a, respectively. The cables 24 and 25 lead from the temperature controller within the housing 11 (FIG. 1) to respective ends of a heating element 26. The apertures 21 and 23 are, respectively, a water inlet and a water outlet. The apertures 21 and 23 provide for circulation of water into and out of the chamber 13 by providing respectively, fluid input into, and fluid outlet from, the interior of the retort 10 during the sterilization or pasteurization and cooling of the foodstuffs, as more fully discussed hereinbelow. Threaded fittings 21a and 23a, which are threadedly engaged within the respective apertures 21 and 23 are in fluid communication respectively with fluid conduits 54 and 55. The aperture 22 provides for coupling between a temperature probe 27 which carries a heat-responsive thermocouple on its distal end, and an associated cable 28 which extends, via a fitting 97, to the pressure controller 12 (FIG. 1) to provide thereon a readout of the water temperature on a LED display 99. Additional LED displays 98, 83 and 87 are provided to display respectively test container temperature, chamber pressure and differential pressure. The displays 83, 87, 98 and 99 in a realized embodiment consists of respective commercially available LED displays which can be obtained from Temp Incorporated. Finally, the aperture 20 provides for coupling between a temperature probe 31, which carries a thermocouple on its distal end, and a heat controller within the housing 11 (FIG. 1) via its associated cable 32 which extends to the temperature controller which controls the current supplied to the heating element 26, whereby control of the heating element 26 is provided. The cables 28 and 32 are fixed within respective threaded fittings 28a and 32a which extend into the threaded apertures 22 and 20, respectively. The retort 10 is mechanically supported on housing 11 by four legs 29, these legs being developed as respective dual stud bolts having first upwardly directed threaded portions which extend into threaded apertures 29a in the bottom cover 15. The other downwardly directed threaded portions of the respective stud bolts 29 are threaded into bores in an upper panel of the housing 11.

Returning now to FIG. 2, the upper cover 14 is a substantially circular shaped element which is positioned over the top of the cylindrical chamber 13. The upper cove 14, like the chamber 13, is fabricated from any suitable material able to withstand temperatures of from 0° F. to 200° F. In the preferred embodiment, the upper cover 14 is removably secured in place by a threading arrangement between a plurality of stud bolts 33 and nuts 34 (which may be wing nuts), as discussed hereinbelow. Attached thusly, an airtight and watertight seal between the chamber 13 and the upper cover 14 is formed.

Referring now to FIG. 4, in addition to FIG. 2, the upper cover 14 is provided having three threaded apertures 35, 36 and 37 formed therein. The aperture 36 provides for fluid coupling between the chamber 13 of the retort 10 and the pressure controller 12, via an associated conduit 40 which leads to the pressure controller. The aperture 37 provides for fluid and electrical coupling, via a conduit 41, from a sample container monitoring probe (sensor) 42 and its associated conduit 43 which leads to the pressure controller 12, as is discussed hereinbelow. The probe 42 may be a modified hypodermic needle, a temperature sensor and connections being added. It is to be understood that the aperture 37 may be used only for the fluid coupling, an additional aperture being provided for electrical coupling. In this case, the conduit 41 would be replaced by two conduits, one for electrical communication and another for fluid communication.

The aperture 35 is connected to an air conduit 44 which provides for the controlled air flow therethrough, between the interior of the retort 10 and the pressure controller 12, as is discussed hereinbelow, a conventional threaded fitting 44a provides for fixing the end of the conduit 44 in the aperture 35 and a conventional fitting 40a provides for fixing the end of the conduit 40 in the aperture 36. A similar threaded fitting 43a is provided for fixing the conduit 43 in the aperture 37.

Returning now to FIG. 2, an upper and a lower intermediate collars, 45 and 46 respectively, are annularly positioned about the chamber 13 abutting the upper cover 14 and bottom cover 15, respectively. The collars 45 and 46 are attached directly to the chamber 13 by a solvent bond, or by any other suitable means. Positioned thusly, the collars 45 and 46 provide for further airtight and watertight sealing of the chamber 13.

An upper collar 47 and a lower collar 48 are annularly positioned about the chamber 13 abutting the upper and lower intermediate collars 45 and 46, respectively. The collars 47 and 48 are respectively secured in place by the plurality of the stud bolts 33 and 16 which are embedded in the collars 47 and 48 and oriented in a direction towards the collars 45 and 46, respectively. The thus secured stud bolts 33 pass through apertures 50 formed in the upper cover 14 and aligned aperture 51 in upper intermediate collar 45. The stud bolts 16 pass through apertures 39 formed in the bottom cover 15 and aligned apertures 49 formed in the lower intermediate collar 46. The nuts 17 and the nuts 34 are positioned on the stud bolts 16 and 33, respectively, in threaded engagement therewith, fixing the aforesaid parts together. The collars 45 and 48 lend additional structural support to the chamber 13. To assure an airtight and a watertight relationship between the top cover 14 and the chamber 13, a gasket may be positioned circumferentially near the edge of the cover 14 so that it contacts the top edge of the chamber. A similar gasket is desirably positioned between the bottom edge of the chamber 13 and the bottom cover 15 to assure an airtight and watertight relationship therebetween.

As illustrated in FIG. 1, positioned immediately below the retort 10 is the housing 11 within which a temperature controller is positioned. The details of the temperature controller are to be described hereinbelow in conjunction with FIG. 10. The temperature controller is electrically connected to the heating element 26, as shown in FIG. 2, via the cables 24 and 25, whereby electrical power required to operate the heating element 26 is provided. The temperature controller is also electrically connected to the temperature probe 31 via the cable 32. Connected thusly, the temperature controller adjusts its electrical power output to the heating element 26 in response to the temperature data transmitted to it via the temperature probe 31. Power is supplied to the temperature controller via a conventional power cord (not shown) which, in turn, is connected to a 110 volts a.c. power source. An electric motor 52 (FIG. 1) is operatively arranged to drive a water-circulating pump 53 (FIG. 1), these components of the system being illustrated as being positioned adjacent to the housing 11 for the sake of clarity. In a realized embodiment, the pump 53 and the motor 52 are positioned within the housing 11. A pair of switch operators 63b and 64b are provided on the front panel of the housing 11 for the purpose of engaging switches (not shown in FIG. 1) which supply power respectively to the heating element circuit and the temperature controller and to the motor 52. A manually operable handle 118 is also provided on the front panel of the housing 11 for positioning a valve (not shown in FIG. 1) in positions which alternatively circulate water either directly into the chamber 13 or indirectly into the chamber through a shunt connection and heat exchanger, the latter when one wishes to cool the pasteurized or sterilized foodstuffs. As visible in FIG. 2, connected via the conventional fittings 21a and 23a respectively to the apertures 21 and 23, are the conduits 54 and 55. The conduit 54 delivers water present in the retort 10, away therefrom, while conduit 55 carries water to the retort 10. Within the housing 11 is a three-way valve and a check valve, as are a number of fluid conduits, which are illustrated schematically in FIG. 10, to which reference is made in more detail hereinbelow. A heat exchanger is also provided and associated with the three-way valve and check valve.

With reference now to FIGS. 5–8, the control container monitoring probe 42 (FIG. 2) is illustrated in more detail. As contemplated, the probe 42 accurately and precisely monitors both the pressure, as well as the temperature, within a sealed control container 100 which, as the other containers, is packed with a given quantity of the foodstuff to be pasteurized or sterilized when used. For the sake of clarity, the foodstuff is not shown in FIGS. 5-8. This probe 42 is designed for use with thin-walled plastic containers and is also preferably designed to be "self-tapping" although this is not required. The monitoring probe 42 includes an elongated needle-shaped temperature probe 101 which carries a temperature sensor comprised of a thermocouple 108 on its distal end and has a rearward portion 102 of increased cross-section. A pair of electrical leads 109 extend from the thermocouple 108 via the elongated portion 101 and the rearward portion 102 and connect, as illustrated in FIG. 2, via the conduits 41 and 43 to the cable 43b, also shown in FIG. 1, and thence to the pressure controller 12. The temperature probe 101 is nested within a probe housing 103. The probe housing 103 may be fabricated from metal, a metal alloy or any other material of sufficient rigidity rendering said probe suitable to pierce the control container. The probe housing 103 has a forward, hollow elongated penetrating portion 104, its distal end being tapered and open. Rearwardly thereof, the probe housing penetrating portion 104 is a threaded portion 105 of increased cross-section, the threaded portion being tapered. Rearwardly thereof, an unthreaded tapered portion 106, in turn, terminates in a rearward portion 107 of even greater cross-section. The rearward section 107 of probe housing 103 abuts the annular rim of the conduit 41 (FIG. 5) providing an airtight and watertight luer-lock fitting therebetween. The conduit 41 is hollow and provides fluid communication between the interior of the control container 100 and the conduit 43c (FIG. 1) which branches off from the conduit 43 and, thence, extends to the pressure controller 12 (FIG. 1).

When the probe housing 103 is threadedly engaged, it provides an airtight and watertight fit between the probe housing 103 and the control container 100 when the probe 42 is inserted into the control container 100. This arrangement also provides an airtight and watertight fit between the control container 100 and the environment within the cylindrical chamber 13 (FIG. 1) when the probe 42 has been inserted into the control container 100. The threaded portion 105 is preferably tapered as noted above, the smallest portion being in the direction of the elongated portion 104 so that an effective seal is provided between the relatively thin wall of the control container 100 an the threaded portion 105.

The cable 43b which splits from the conduit 43, as illustrated, carries temperature information received from the thermocouple 108 via the leads 109 and the cable 43b to the pressure controller 12. The conduit 43c, which also splits from the conduit 43, carries fluid from within the control container 100 into the controller 12 via a coupling 77, thusly supplying pressure received from the area surrounding the temperature sensing probe portion to the pressure controller 12 via the bore within the housing 103. It is to be understood that the cable 43b and the conduit 43c could be replaced with separate members which extend through separate apertures in the upper cover 14. It should also be noted, as pointed out above that the probe housing 103 is hollow and is open at both ends so as to define a bore therethrough. It is in this bore that the temperature probe 101 is nested and it is the pressure appearing in this bore that is monitored. It is to be appreciated that the temperature probe 101 extends slightly beyond the tip of the penetrating portion 104 of the probe 42. Consequently, it is desirable, when inserting the probe 42 through the wall of the control container 100, that the inserting be effected prior to positioning the needle-shaped temperature probe 101 within the probe housing 103. The thermocouple 108 desirably should be positioned at the geometric center of the control container 100.

Figure 9:
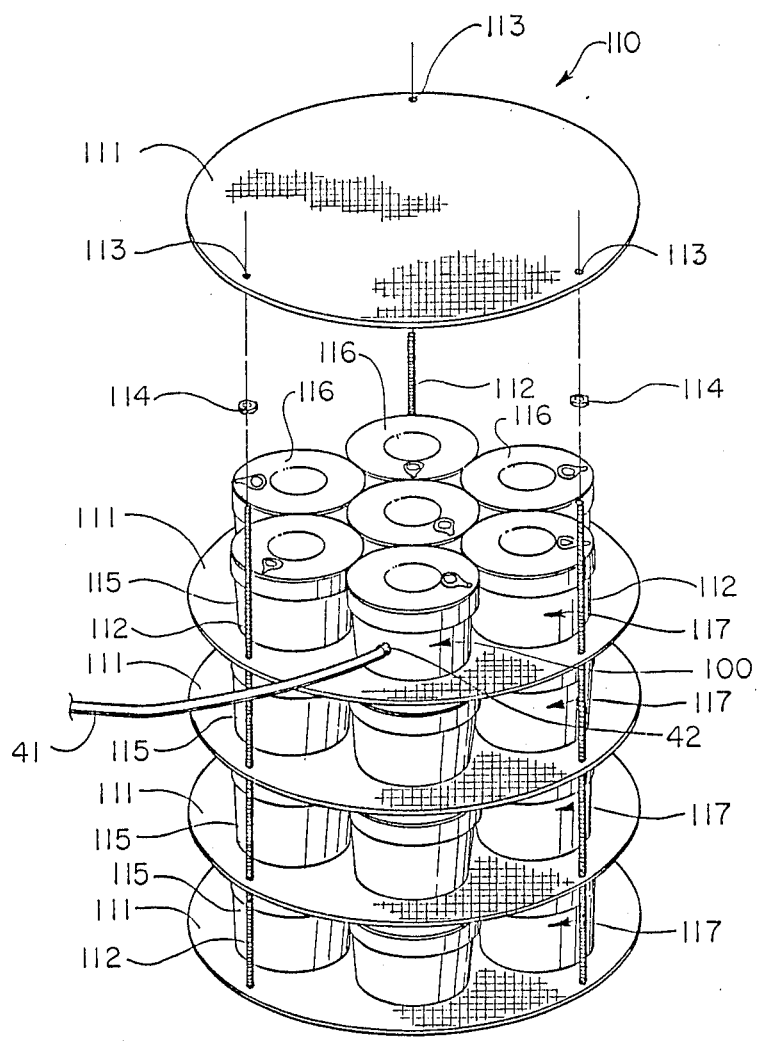
FIG. 9 is a pictorial view of a multilayer support upon which containers having foodstuffs therein may be placed and which is particularly suitable for practicing the present invention, the support being positionable within the pasteurizing or sterilizing chamber of the apparatus illustrated in FIG. 1.

Referring now to FIG. 9, thin-walled plastic containers 117, including the control container 100 are, during use, filled with foodstuffs to be pasteurized or sterilized and positioned within the chamber 13 (FIG. 1) of retort 10 on a tiered tray assembly 110. The tray assembly 110 is comprised of a plurality of vertically spaced shelves 111 of circular configuration which are carried by a plurality of elongated threaded bolts 112 which are positioned equidistantly about the perimeter of each of the shelves, extending through respective apertures 113 therein. Respective nuts 114 are threaded onto each respective elongated bolt 112 at the height where a particular one of the shelves 111 is desired. Once a set of the nuts 114 are threadedly in place, one of the shelves 111 is then inserted over the bolts 112 and lowered downwardly thereon until it contacts the set of nuts 114. This assembling continues until all of the shelves 111 are in place. Contact between the individual shelves 111 and the nuts 114 restrains the shelve from further a downward movement and also supports the shelves in place during the use thereof. The shelves 111 are preferably of a screen or grid-like construction so that hot water may circulate freely through the shelves and about the containers 100 and 117.

The containers 117, including the control container 100, of the present invention, are all of standard shape for receiving therein edible foodstuffs. The containers 100 and 117 are all formed of plastic (or other suitable material) able to withstand temperatures of between 0° F. and 200° F. The containers 100 and 117 are formed having relatively thin walls 115 which are pierceable. However, the walls must be of sufficient shape and resiliency to expand and to deflect, without rupturing, in response to small increases and/or decreases of pressure within the containers 100 and 117, relative to pressure within the chamber 13 (FIG. 1). Finally, after the edible foodstuffs have been placed therein, the containers could be flushed with nitrogen and hermetically sealed with respective lids 116 placed thereon. The probe 42 is inserted through the side wall 115 of the control container 100. Once the containers 100 and 117 have been filled with foodstuff, and placed on the shelves 111, the probe 42 having been inserted through the wall 115 of the control container 100, the assembly shown in FIG. 9 is inserted into the chamber 13 (FIG. 1) and the probe 42 connected to the conduit 41 (FIG. 1). The top cover 14 (FIG. 1) is then secured to the top of the chamber 13 of the retort 10. It is to be understood that containers of different shapes and/or sizes and/or of different materials can be used in place of the containers 100 and 117, as shown. The containers could be formed of thin, very flexible plastic material in the form of pouches. The containers could be of thin metal construction presenting a can-like appearance. Another possible construction which could be used in practicing the present invention is a foil tray and paper composite. Foil-lined paper also could be used.

Figure 10:
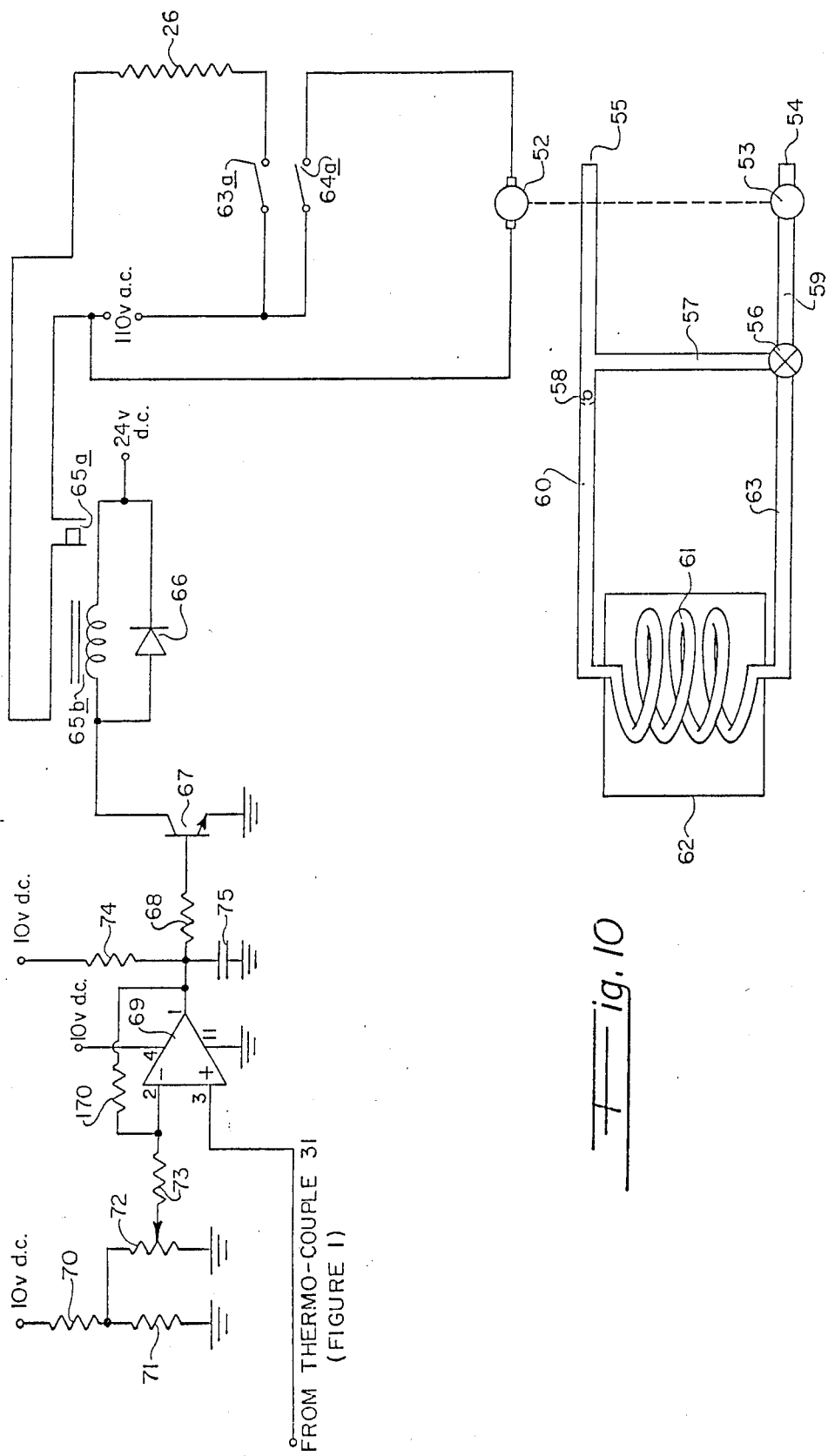
FIG. 10 is a simplified, schematic diagram of a controlled water heating, circulating and cooling system which may be used as part of the pasteurizing or sterilizing apparatus of FIG. 1.

In FIG. 10, a schematic diagram of controlled water heating, circulating and cooling system, which may be used as part of the pasteurizing or sterilizing apparatus of FIG. 1 includes the electric motor 52 and the water pump 53 which it drives. As illustrated in FIG. 10, the pump 53 receives water via the water carrying conduit 54 from the retort chamber 13 (FIG. 1) and recirculates the water to the chamber via a conduit 59, a three-way valve 56, a connecting conduit 57 and the conduit 55 when the valve 56 is in its first position, as set by a user who has manipulated the handle 118 (FIG. 1). A check valve 58 positioned in a conduit 60 prevents water passing to the conduit 55 from being diverted into the conduit 60 and, thence into a cooling coil 61 positioned within a heat exchanger 62.

In its second position by virtue of the user moving the handle 118 (FIG. 1), the three-way valve 56, which still receives water from the pump 53 via the conduit 59, diverts water away from the conduit 57 and into the cooling coil 61, via a conduit 63. The water is cooled, by action of the heat exchanger 62 and returned to the chamber 13 (FIG. 1) via the conduit 60, the check valve 58 and the conduit 55.

The motor 52 is energized from a 110 volts a.c. source via a switch 64a which is actuated by the manually movable operator 64b (FIG. 1) accessible on a front panel of the housing 11 (FIG. 1). Power to the heating element 26 is supplied from the 110 volt a.c. source via a second switch 63a, which is actuated by the second manually movable operator 63b (FIG. 1) accessible on the front panel of the housing 11 (FIG. 1), and a pair of contacts 65a of a solenoid which are closed whenever current flows in the winding 65b of the solenoid. A diode 66 is connected in parallel with the winding 65b which is in series with the collector-emitter path of an npn transistor 67 between a source of 24 volts d.c. and circuit ground. The transistor 67, which is commercially available from Motorola, Inc. under the designation MJE521, has its base connected via a 10K ohms resistor 68 to the output pin of an operational amplifier 69, which may be composed of one-half of an integrated circuit available from Motorola, Inc. under the designation LM393N. The output terminal (pin 1) of the operational amplifier 69 is connected to the inverting input terminal (pin 2) thereof via a 10M ohms resistor 170. The noninverting input terminal (pin 3) of the operational amplifier 69 is connected to a terminal which receives an output signal from the temperature sensing thermocouple 31 (FIG. 1) via the cable 32 (FIG. 1). Circuit ground and 10 volts d.c. connections are provided to appropriate terminals (pins 11 and 4).

In order to provide a temperature set point (the temperature at which one wishes to pasteurize or to sterilize foodstuffs) a voltage divider consisting of two resistors 70 and 71 are connected in series between a circuit point of 10 volts d.c. and circuit ground, a potentiometer 72 being connected between ground and a point between the resistors 70 and 71. The wiper of the potentiometer 72 is connected to the inverting input terminal of the operational amplifier 69, via a 10K ohms resistor 73. A 3K ohms resistor 74 is connected between the 10 volts d.c. source and the output terminal of the amplifier 69, a 0.1 f capacitor 75 being connected to circuit ground.

The operational amplifier 69 functions to compare the voltage indicative of the actual temperature of the water within the chamber 13 (FIG. 1) with a set point temperature, represented by the voltage on the inverting input terminal as set by the wiper of the potentiometer 72, providing a ONE output whenever the actual water temperature falls below the set point, causing the transistor 67 to become conductive. Current flows in the winding 65b of the solenoid, closing the contacts 65a thereby supplying current to the heating element 26, provided the switch 64a has been closed by a user who has depressed the operator 63b on the front panel of the housing 11. When the water temperature within the chamber 13 reaches a value above the desired temperature, as sensed by the thermocouple 31, the output terminal of the operational amplifier 69 becomes zero, the transistor 67 is rendered inconductive and the contacts 65a of the solenoid open. Heating current ceases to be supplied to the heating element 26 until the temperature of the water again becomes too low.

Figure 11:
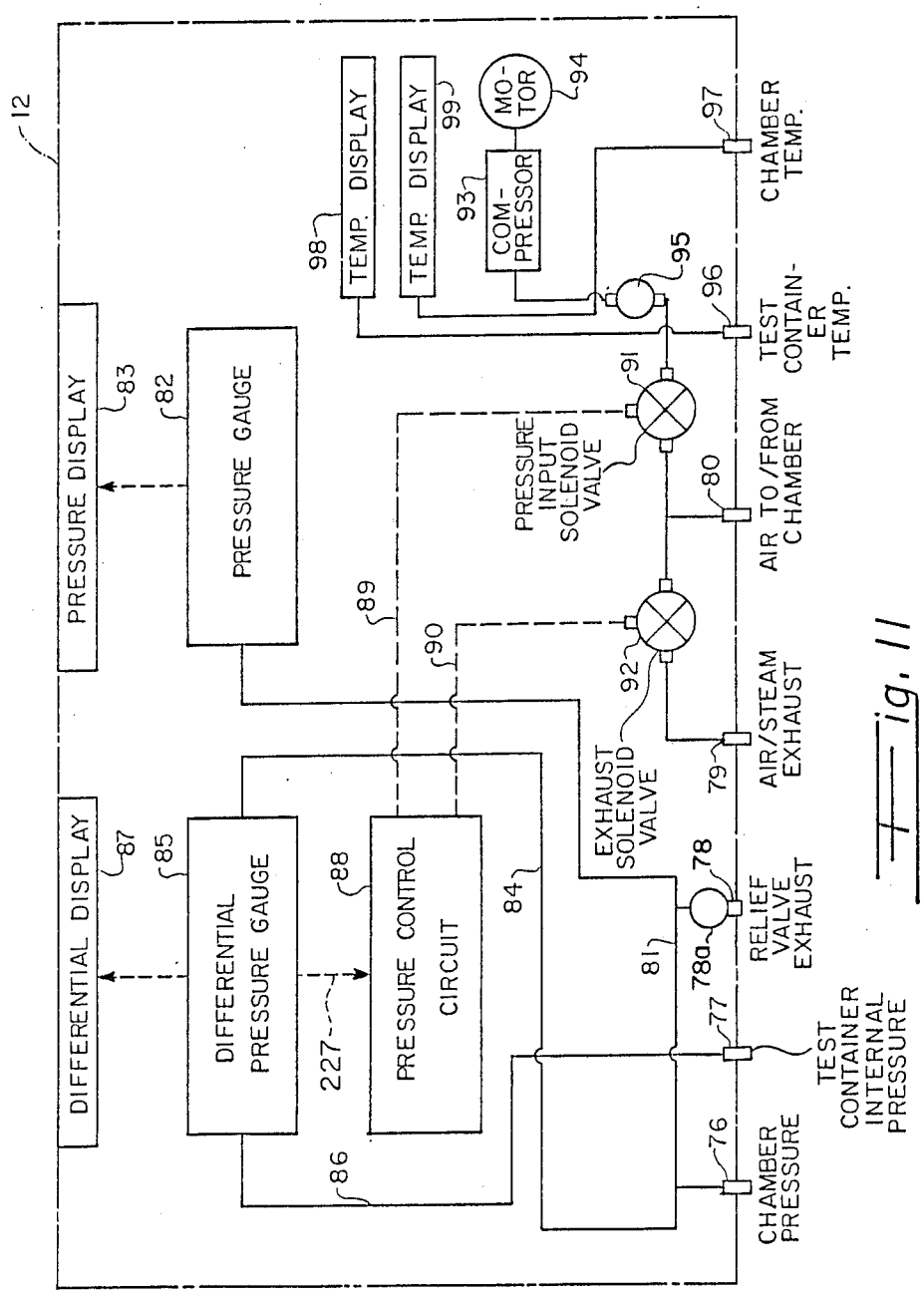
FIG. 11 is a block diagram of a pressure control system, with associated temperature and pressure readout displays, which may be used as the controller shown in FIG. 1, in accordance with the present invention.

Turning now to FIG. 11, an exemplary pressure controller 12 includes a number of pneumatic couplings 76, 77, 78, 79 and 80, shown diagrammatically. The coupling 76 is in fluid communication with the chamber 13 (FIG. 1) via the conduit 40 and supplies air and/or steam via a conduit 81 to a pressure gauge 82, which contains a conventional pressure-to-voltage transducer. This transducer converts the sensed pressure into an electrical signal which, after conventional processing, is fed to the LED output display 83.

Figure 12:
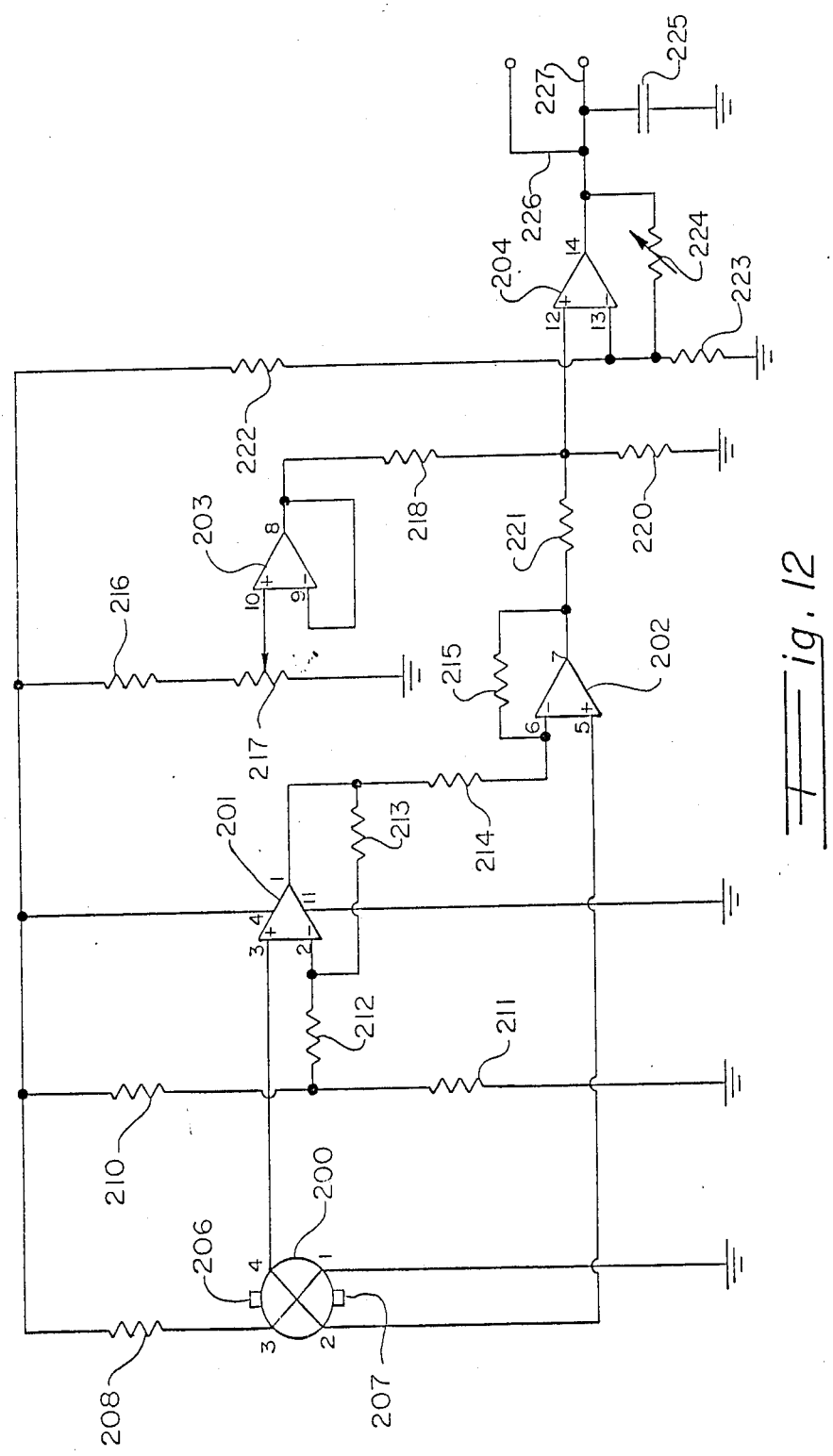
FIG. 12 is a detailed schematic diagram of an electronic differential pressure gauge which may be used as the differential pressure gauge in the pressure control system illustrated in FIG. 11.

The coupling 76 also supplies the air and/or steam from the chamber 13 of the retort 10 to a second conduit 84 which communicates with a first input of a differential pressure gauge 85, which is illustrated in more detail in FIG. 12 and which has a second input in fluid communication, via a conduit 86, with the coupling 77 to which is supplied fluid from within the sealed control container 100 positioned within the chamber 13 (FIG. 1) from the probe 42 (FIG. 2) via the conduits 41, 43 and 43c. The differential pressure gauge 85 has two electrical outputs. The first output is supplied to the LED readout display 87 so that a user may observe the differential pressure, if desired.

Figure 13:
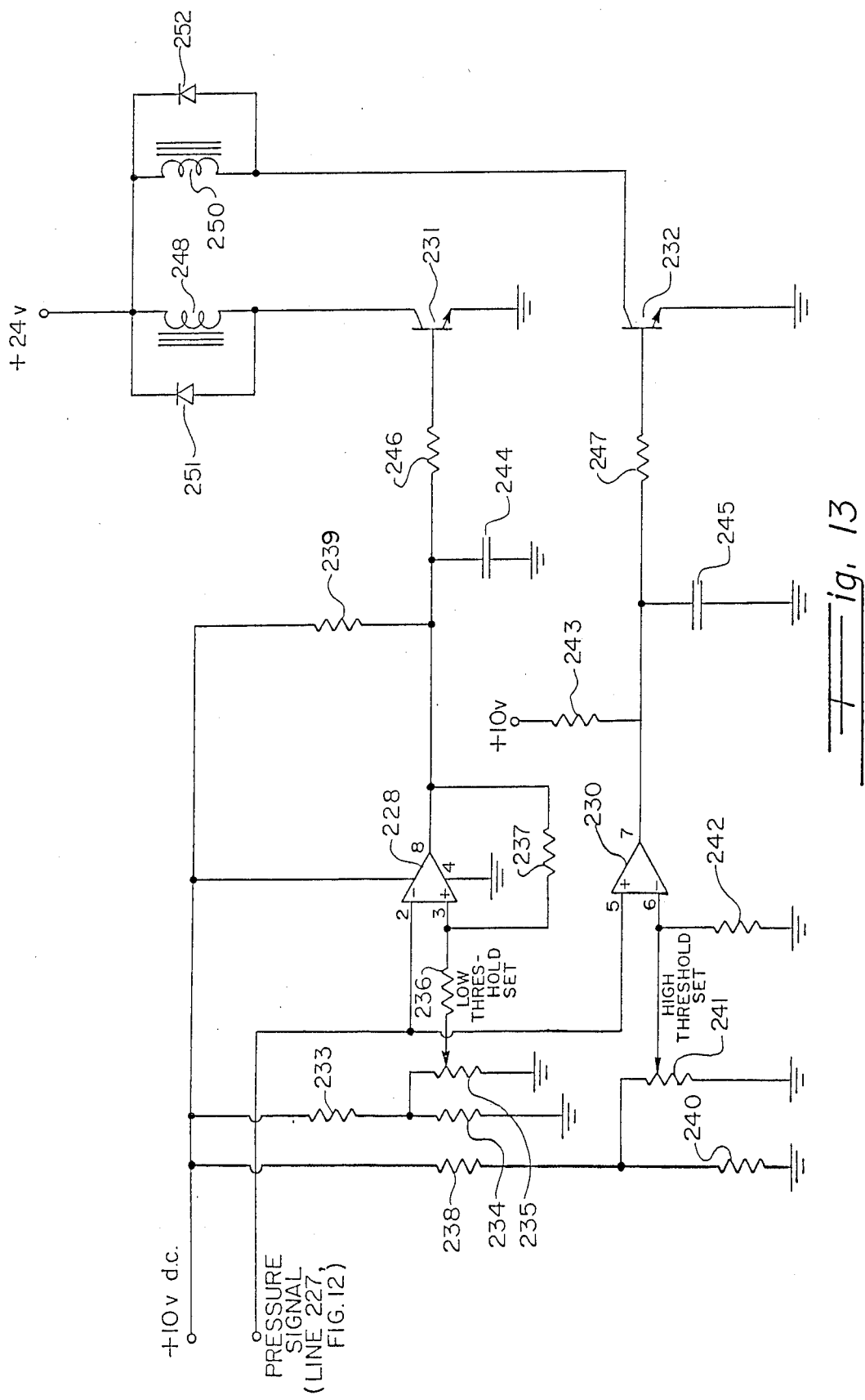
FIG. 13 is a detailed schematic diagram of an electronic pressure control circuit which may be used as the pressure control circuit in the pressure control system illustrated in FIG. 11.

A second electrical output from the differential pressure gauge 85 is coupled to a pressure control circuit 88, shown in more detail in FIG. 13. The pressure control circuit 88, as shown in FIG. 11, has two electrical output lines 89 and 90 on which appear respective enabling signals for energizing respectively a pressure-increasing solenoid valve 91 and a pressure-reducing (exhaust) solenoid valve 92. When the pressure-increasing solenoid valve 91 is open, in response to a signal on the line 89 indicating the pressure within the chamber 13 in too low, air under pressure is supplied from an air compressor 93 driven by an electric motor 94 to the coupling 80 and thence to the chamber 13 via the conduit 44. A 15 psi pressure relief valve 95 is provided between the compressor 93 and the valve 91 so that the pressure in the conduit 44 and the chamber 13 will never get above 15 psi. When the exhaust solenoid valve 92 is open, in response to a signal on the line 90 indicating that the pressure within the chamber 13 is too great relative to the pressure within the test container 100, air and/or steam from within the retort chamber 13 passes through the coupling 80, the valve 92 and out the coupling 79, which vents to the ambient atmosphere. The coupling 78 is connected to the conduit 81 via a 30 psi pressure relief valve 78a, providing protection by assuring that the pressure within the chamber 13 or the retort 10 will not exceed 30 psi.

In as much as the LED output displays 87 and 83 are provided for viewing pressure and differential pressure levels on a panel of the pressure controller 12, it is convenient also to display the temperature of the interior of the test container 100 and the chamber 13, output leads from the thermocouples which sense the respective temperatures within the test container 100 and within the retort chamber 13 are respectively supplied, via electrical couplings 96 and 97, to the respective LED readout displays 98 and 99.

Turning now to FIG. 12, the details of the differential pressure gauge 85 are illustrated.

As illustrated in FIG. 12, an exemplary electronic differential pressure gauge, which may be used as the gauge 85 (FIG. 11), includes a pressure transducer 200 and four operational amplifiers 201–204. The transducer 200, in a realized embodiment, is a semiconductive piezoresistive strain gauge having a transverse voltage diffused, pressure sensitive element as its differential pressure responsive component commercially available from Motorola, Inc. under the designation MPX-200DP. The amplifiers 201–204 are, in the realized embodiment, constituted by a commercially available quad operational amplifier integrated circuit available from National Semiconductor, Inc. under the designation LM324N, the pin numerals being shown in FIG. 12.

The diagrammatically represented transducer 200 has two fluid pressure input ports 206 and 207 to which the conduits 84 (FIG. 11) and 86 (FIG. 11) are connected. The transducer has four electrical pins (terminals) designated respectively by pin numerals 1–4. Pin 1 of the transducer 200 is connected to circuit ground, pin 3 being connected to 10 volts d.c. bus via a 1.8K ohms resistor 208. The electrical input to the transducer 200 is constituted by the current which flows between the pins 1 and 3. At zero differential pressure, in the realized embodiment, approximately one volt d.c. appears at the pins 2 and 4 of the transducer 200. As the sensed pressure differential deviates from zero, the voltage on the respective pins 2 and 4 changes accordingly and in a direction determined by the sign of the difference.

The pins 2 and 4 of the transducer 200 are conductively connected to the respective noninverting input terminals (pins 5, 3) of the operational amplifiers 202 and 201, which function as temperature stabilizing, active gain amplifiers.

A first voltage divider constituted by a 82K ohms resistor 210 and a 1K ohms resistor 211 are connected, in the order named, between the 10 volts d.c. bus and circuit ground. A 5.1K ohms resistor 212 is connected from the circuit point between the resistors 210 and 211 and the inverting input terminal (pin 2) of the operational amplifier 201, a 220 ohms resistor 213 being connected between the output terminal (pin 1) and the inverting terminal (pin 2). The output terminal (pin 1) of the operational amplifier 201 is connected, via a 220 ohms resistor 214, to the inverting input terminal (pin 6) of the operational amplifier 202, a 10K ohms resistor 215 being connected between the inverting input terminal and its output terminal (pin 7). In operation, under the condition of zero pressure differential, the voltage which appears at the output terminal (pin 7) of the operational amplifier 202 is approximately two volts. Were the pressure difference to deviate in one direction, the voltage would decrease and were it to deviate in the other direction the voltage would increase.

The operational amplifier 203 is operatively arranged to provide an offset function. If one desired to operate the system of FIG. 11 so that the set point would be other than zero differential pressure with the pressure within the containers being maintained during pasteurization or sterilization either slightly greater of slightly less than the pressure within the retort chamber 13 (FIG. 1), one may adjust the voltage supplied to the noninverting input terminal (pin 10) of the operational amplifier 203. For this purpose a 6.8K ohms resistor 216 is connected in series with a 5K ohms potentiometer 217 between the 10 volt d.c. bus and circuit ground, the inverting input terminal (pin 9) and the output terminal (pin 8) of the operational amplifier 203 being conductively connected. A 12K ohms resistor 218 and a 4.7K ohms resistor 220 are series connected in the denominated order between the output terminal (pin 8) of the operational amplifier 203 and circuit ground, a 4.7K ohm resistor 221 being connected between the output terminal (pin 7) of the operational amplifier 202 and the circuit point between the resistors 218 and 220.

The circuit point between the resistors 218 and 220 is also connected to the noninverting input terminal (pin 12) of the operational amplifier 204. The inverting input terminal (pin 13) of the operational amplifier 204 is connected to a circuit point between a 20K ohms resistor 222 and a 2.2K ohms resistor 223 which are connected, in the denominated order, between the 10 volts d.c. bus and circuit ground. It is possible for the one adjustable potentiometer 217 to be used both for negative and positive differential pressure offsets because of the 2.0 volts d.c. step provided the output terminal (pin 7) of the operational amplifier 202 under zero offset circuit conditions. The output terminal (pin 14) of the operational amplifier 204 is connected, via a 10K ohms adjustable resistance 224 to its inverting input terminal (pin 13), this adjustable resistance being used to adjust the gain of the system once the offset (if any) has been set by adjusting the potentiometer 217.

A signal representing pressure difference, offset in either direction if desired, appears on the output terminal (pin 14) of the operational amplifier 204. This output appears across a 0.01 f capacitor 225 and is supplied via output line 226 to the differential readout LED display 87 (FIG. 11). The output also appears on an output line 227, also so designated in FIG. 11, from which it is supplied to the pressure control circuit 88 (FIG. 11) shown in detail in FIG. 13.

As illustrated in FIG. 13, the pressure control circuit includes a pair of operational amplifiers 228 and 230 and two npn drive transistors 231 and 232. The operational amplifiers 228 and 230, in the realized embodiment, were constituted by respective one-half of a commercially available integrated circuit obtainable from National Semiconductor, Inc. under the designation LM393N. The transistors 231 and 232 can be commercially available transistors, which may be obtained from Motorola, Inc. under the designation MJE521.

The electronic differential pressure gauge illustrated in FIG. 12 has a circuit ground in common with the pressure control circuit illustrated in FIG. 13, the output pressure differential representing signal, offset in either direction if desired, which appears on output line 227 (FIG. 12) is fed directly to the inverting input terminal (pin 2) of the operational amplifier 228 and to the noninverting input terminal (pin 5) of the operational amplifier 230.

A first voltage divider consisting of a 51K ohms resistor 233 and a 10K ohms resistor 234 connected in series, in the denominated order, between a 10 volts d.c. bus and circuit ground. A 10K ohms low-threshold-setting potentiometer 235 is connected from a circuit point between the resistors 233 and 234 and circuit ground, its wiper being connected to the noninverting input terminal (pin 3) of the operational amplifier 228, via a 10K ohms resistor 236. The output terminal (pin 1) of the operational amplifier 228 is connected to the noninverting input terminal (pin 3) via a 10M ohms resistor 237 and is connected to the 10 volt d.c. bus via a 3K ohms resistor 239.

A second voltage divider, consisting of a 51K ohms resistor 238 and a 10K ohms resistor 240, is connected between the 10 volts d.c. bus and circuit ground, the resistors being connected in series in the denominated order. A high-threshold-setting potentiometer 241 is connected between circuit ground and the circuit point between the resistor 238 and 240, its wiper being conductively connected to the inverting terminal (pin 6) of the operational amplifier 230. This inverting terminal is also connected to circuit ground via a 1M ohms resistor 242. The output terminal (pin 7) of the operational amplifier 230 is connected to the 10 volt d.c. bus via a 3K ohms resistor 243.

The respective output terminals (pins 1 and 7) of the respective operational amplifiers 228 and 230 are connected to circuit ground via respective 0.01 f capacitors 244, 245 and to the respective base electrodes of the transistors 231 and 232 via respective resistors 246 and 247. Respective diodes 251 and 252 are connected in parallel to the respective solenoid coils 248 and 250, their cathodes being connected to a positive 24 volts d.c. bus.

The emitters of each of the transistors 231 and 232 are connected directly to circuit ground, their respective collectors being connected to one the terminal of respective solenoid coils 248 and 250. The other ends of the solenoid coils 248 and 250 are connected to the positive 24 volts d.c. bus.

Whenever the transistor 231 is rendered conductive, by action of the operational amplifier 228 responding to an input signal indicative that the pressure difference signal is too low and beyond the lower threshold set by the potentiometer 235, current flows in the solenoid winding 248 causing the pressure solenoid valve 91 (FIG. 11) to open thereby supplying air under pressure from the compressor 93 (FIG. 11) to the retort chamber 13 (FIG. 1). As a result, pressure builds up in the chamber 13 until the signal to the inverting terminal (pin 2) of the operational amplifier 228 indicates that the pressure difference is now within acceptable limits, the transistor 231 become nonconductive and current stops flowing in the solenoid winding 248. Consequently, the pressure solenoid valve 91 (FIG. 9) returns to its closed condition until the pressure difference again becomes too great, with the pressure within the chamber 13 (FIG. 1) being too low with respect to the pressure within the test container.

In the event the pressure difference becomes too great, with the pressure within the chamber 13 (FIG. 1) being too high, the output from the operational amplifier 230 enables the transistor 232 to conduct, resulting in current flow in the solenoid winding 250. This current flow causes the exhaust solenoid valve 92 (FIG. 11) to open, allowing compressed air and/or steam from the chamber 13 (FIG. 1) to escape into the ambient atmosphere via the fluid outlet fitting 79 (FIG. 11) until the difference in pressure between the chamber 13 (FIG. 1) and the test container 100 is within acceptable limits. The transistor 232 then becomes nonconductive, current stops flowing in the solenoid winding 250 and the exhaust solenoid valve 92 (FIG. 11) closes. This condition prevails until the pressure difference again becomes too great, with the pressure in the chamber 13 (FIG. 1) having also become too high.

The operational sequence of the apparatus and process of the present invention can be understood and appreciated, by referring to the text below. This sequence shall be described utilizing crabmeat as the edible foodstuff, but it is to be understood that the principles taught herein are equally applicable to other foodstuffs, as well as various inedible objects.

Preliminary, a desired plurality of the containers 117, including the control container 100, are filled with crabmeat and associated seasonings etc. The containers 100 and 117 may be flushed with nitrogen and are then hermetically sealed, the lids 116, being placed thereon (FIGS. 5-9).

The containers 100 and 117 are then placed on the tiered shelf assembly 110, as desired (FIG. 9). Individual shelves 111 may be added to, or removed from, the assembly 110 as needed. The tip of the forward elongated piercing portion 104 of the probe housing 103 of the "self-tapping" probe 42 is then placed against the pierceable thin-wall 115 of the control container 100 in a position being substantially equidistant between the top to the bottom of the control container 100 and inserted into the interior of the container substantially so that its tip and the thermocouple 108 are substantially at the geometric center of the control container 100. During application of force to the probe 42 it moves through the wall 115 of the control container 100 until its threaded portion 105, which is tapered, engages the wall 115. The probe 42 is then "tapped" or threaded into the wall 115 until a seal is effected. In this respect the probe 42 is "self-tapping". The temperature sensor (FIG. 8) is then inserted into the probe housing 103. Inserted thusly, the tip of the temperature probe 101, which supports the thermocouple 108, and the tip of the housing 104 are positioned at substantially the approximate geometric center of the control container 100. The control container 100 is then placed on a shelf of the assembly 110, preferably at the approximate center of the middle level, it being shown on the outer portion of a level for the sake of showing the position of the probe 42 therein.

Once the final height of the assembly 110 is known, the retort chamber 13 is manually filled with water to a height sufficient to cover the containers 100 and 117 on all of the shelves 111 of the tiered assembly 110. In order to fill the chamber 13, water is poured through the upper portion of the retort 10 when its upper cover 14 is removed. Once filled with water, the assembly 110 having the containers 100 and 117 thereon are placed in the retort chamber 13 where they are immersed in the water therein. Now the user activates the external power source which provides 110 v a.c. power to the pressure controller 12 and to the temperature controller housed in the housing 11, which includes the temperature control means and the water circulation means. The temperature control set point desired is also chosen and adjusted, by setting the wiper of the potentiometer 72 at a selected point. The temperature chosen will depend on what foodstuffs are involved and whether one wishes to pasteurize or to sterilize. For purposes of illustration crabmeat is used as an example. Where crabmeat is involved, pasteurization thereof is affected at 195° F. The shunt valve control knob 118 (FIG. 1) is manually adjusted so as to move the shunt valve 56 (FIG. 10) into its first position.

With the shunt valve 56 in its first position, water is recirculated through the retort chamber 13 by the action of pump 53. The pump 53 draws liquid from the chamber 13 via the aperture 21 and the conduit 54. Liquid then passes through, respectively, the conduit 59, the valve 56 and the third conduit 57, liquid returning to the chamber 13 through the conduit 55 and the aperture 23, respectively. The movement of water in this direction in the conduit 55 forces the float ball check valve 58 into its seated position, thereby blocking the flow of water through the conduit 60 into the heat exchanger 62 (FIG. 10).

As the water circulates through the retort 10, it is heated by the heating element 26. This heating causes the water temperature in the retort chamber 13 (and elsewhere) to rise, which begins to effect the pasteurization process. The water temperature within the retort chamber 13 is constantly monitored by the heat responsive thermocouple 31 (FIG. 2) which is connected to, and relays information to, the temperature controller in the housing 11 via the cable 32.

The temperature controller, as illustrated in FIG. 10, supplies power to the heating element 26, until a desired preset temperature, which in this case is 195° F., is achieved. The probe 42 is then coupled to the cable 41 with the leads 109 connected electrically to lines and the upper cover 14 is secured in place by tightening the threading engagement between the nut 34 and the stud bolts 33, as aforesaid. Once this temperature is achieved, the heat controller controls the electrical output from the controller to the heating element 26. In this manner, once the desired temperature (195° F.) has been achieved, the temperature will be maintained for a desired preset period of time such as is required to insure the successful completion of the pasteurization process. Were sterilization to be required, the temperature set point would be appropriately higher. Of course, in this case the cylindrical chamber 13, the upper cover 14 and the bottom cover 15, as well as the conduits, would be made of appropriate material to withstand the higher temperatures which would be encountered were sterilization to be achieved. In production embodiments it is contemplated that the conduits, chamber 13, upper cover 14 and lower cover 15 would be of suitably gauged metal, for example, stainless steel.

Simultaneously with the aforementioned heating, the water temperature probe 27 (FIG. 2) relays information on the temperature of the water in the retort chamber 13 to the pressure controller 12. In the pressure controller 12, this information is analyzed and displayed for visual readout on the LED display 99.

As the pasteurizing (or sterilizing) process proceeds, the temperature of the water in the retort chamber 13 will increase the temperature of the crabmeat in the containers 100 and 117, thereby affecting the pasteurizing (or sterilizing) thereof. As the temperature increases, the crabmeat releases gases and/or vapors which causes the pressure inside of the containers 100 and 117 to rise. The rise in temperature within the control container 100 is sensed by probe 42, which, via the conduit 41 and cable 43b, is carried to the pressure controller 12 where it is visually displayed on the second LED display 98. The rise in pressure within the control container 100 is sensed by probe 42 and is coupled, via the conduits 41, 43 and 43c to the pressure controller 12. Within the pressure controller 12, the pressure information carried by the conduit 43c is inputted into the pressure transducer 200 (FIG. 12). The temperature of the water in the retort chamber 13 simultaneously increases the pressure therein. This increasing pressure is coupled to the pressure controller 12, via the conduit 40, where it is also inputted into the transducer 200 (FIG. 12). The information as to the pressure within the retort chamber 13 is also transmitted for visual display on the third LED readout display 83.

The information inputted into the transducer 200 from the conduit 40 regarding the pressure in the retort chamber 13 and from conduit 43c regarding the pressure in the control container 100 are, in turn processed by the differential pressure gauge 85 (FIG. 11), the differential comparison resulting from processing of this information is relayed from gauge 85 to the fourth LED readout display 87 for visual display thereon. This differential comparison is also further processed in the pressure control circuit 88 which activates the pressure input solenoid valve 91 when the pressure within the chamber 13 is too low. The air compressor 93 then pumps a sufficient quantity of air from the pressure controller 12 to the retort chamber 13 via the conduit 44 so as to substantially equalize the pressure within the retort chamber 13 with the pressure inside the control container 100 at all times during the process. Of course, if an offset has been provided, the pressure within the chamber 13 could be maintained at slightly above or slightly below the pressure within the container, as indicated hereinabove, were the wiper of the potentiometer 217 (FIG. 12) previously adjusted to provide either positive or negative offsets as may be desired. For example, one may wish to maintain the pressure within the containers 100 and 117 slightly above the pressure within the retort chamber 13 so as to remove creases or indentations therefrom and give the containers a "full" appearance. On the other hand were the containers 100 and 117 extremely flexible, more or less flat packages, one might wish to assure that the pressure within the containers is maintained slightly below the pressure within the chamber 13 to assure good thermal communication from the water in the chamber to the foodstuffs within the containers.

Once heating of the containers 100 and 117 at 195° F. for the desired length of time has been achieved, the cooling process is commenced by shutting the heating element 26 off and manually moving the control knob 118 (FIG. 1) so as to move the three-way valve 56 (FIG. 10) into its second position.

With the three-way valve 56 in its second position water is recirculated by the action of pump 53 from the retort chamber 13 via the conduit 54 having the valve 56 interposed therein, the conduit 63, the coil 61 in the heat exchanger 62, the conduit 60 having the float ball check valve 58 disposed therein and the conduit 55 and back into the retort chamber 13. The movement of water in this direction in the conduit 60 forces the float ball check valve 58 into its unseated position, thereby permitting the free flow of water from the heat exchanger 62 into the retort chamber 13 via the conduit 55.

As the water circulates through the above described system, it is cooled by indirect heat exchange relationship with a suitable cooling medium (such as ice, water, air, ammonia, etc.) in the heat exchanger 62. This indirect cooling gradually decreases the temperature of the fluid in the chamber 13 which in turn decreases the temperature of the crabmeat within the containers 100 and 117. While still maintaining the pressure differential at substantially zero or slightly greater or slightly less, if a user had elected to provide an offset. Consequent decreases in pressure caused by changes in the temperature as aforesaid, are relayed to the pressure controller 12 in the same manner as was described above with reference to the heating in the sterilization or pasteurization process. Accordingly, the pressure controller 12 will both visually display the monitored parameters on the displays 83, 87, 98 and 99 and will substantially equalize the pressure as aforesaid by allowing air to exit from the retort chamber 13 via the exhaust solenoid valve 92 in a controlled fashion.

Once the desired cooling has been achieved, the power supplies to the various components of the system may be disconnected. The water pump motor 52 can also be disconnected. The upper cover 14 may be removed from the retort chamber 13 by loosening and removing the appropriate nuts 34 carried by the stud bolts 33. The shelf assembly 110 carrying the containers 100 and 117 may then be removed from the chamber 13 and the containers 117 are thereby ready for appropriate packaging and shipping. The control container 100 and its contents may be discarded, after removing the probe 42 therefrom.

Accordingly, it will be appreciated by those skilled in the art that within the scope of the appended claims, the invention may be practiced other than has been specifically described herein.

What is claimed is:

1. A probe adapted to be inserted into a closed thin plastic container for monitoring pressure and temperature therein, the probe comprising temperature sensing means; a hollow member having a forward piercing open end and a rearward open end defining a bore therethrough to provide open space for passage of fluid from within the thin plastic container whereby fluid pressure therein may be monitored, an intermediate portion of said hollow member between said piercing open end and said rearward open end being tapered, the taper thereof converging toward said piercing open end; self tapping threads provided on an exterior surface of the tapered intermediate portion of said hollow member to spread and tap through the closed thin plastic container; the temperature sensing means supported by means within the hollow member for sensing temperature within the thin plastic container; and means within said bore for allowing electrical communication with said temperature sensing means.

2. The probe according to claim 1, wherein said exterior surface comprises a threaded portion and an unthreaded portion, said threaded portion containing said self tapping threads, said threaded portion being the portion nearest to said piercing open end.

3. A probe adapted to be inserted into a closed thin plastic container for monitoring pressure therein, the probe comprising a hollow member having a forward piercing open end and a rearward open end defining a bore therethrough to provide open space for passage of fluid from within the thin plastic container whereby fluid pressure therein may be monitored, an intermediate portion of said hollow member between said piercing open end and said rearward open end being tapered, the taper converging toward said piercing open end; and self tapping threads provided on an exterior surface of the tapered intermediate portion of said hollow member to spread and tap through the closed thin plastic container.

4. The probe according to claim 3, wherein said exterior surface comprises a threaded portion and an unthreaded portion, said threaded portion containing said self tapping threads, said threaded portion being the portion nearest to said piercing open end.

5. A probe adapted to be inserted into a closed thin plastic container for monitoring temperature therein, the probe comprising temperature sensing means; a hollow member having a forward piercing open end and a rearward open end defining a bore therethrough to provide open space, an intermediate portion of said hollow member between said piercing open end and said rearward open end being tapered, the taper converging toward said piercing open end; self tapping threads provided on an exterior surface of the tapered intermediate portion of said hollow member to spread and tap through the closed thin plastic container; the temperature sensing means supported by means within the hollow member for sensing temperature within the thin plastic container; and means within said bore for allowing electrical communication with said temperature sensing means.

6. The probe according to claim 5, wherein said exterior surface comprises a threaded portion and an unthreaded portion, said threaded portion containing said self tapping threads, said threaded portion being the portion nearest to said piercing open end.

* * * * *